(12) United States Patent
Stewart et al.

(10) Patent No.: US 7,260,770 B2
(45) Date of Patent: Aug. 21, 2007

(54) BLOCK PUNCTURING FOR TURBO CODE BASED INCREMENTAL REDUNDANCY

(75) Inventors: Kenneth A. Stewart, Grayslake, IL (US); Amitava Ghosh, Buffalo Grove, IL (US); Michael E. Buckley, Gurnee, IL (US); Raja S. Bachu, Waukegan, IL (US); Rapeepat Ratasuk, Wilmette, IL (US)

(73) Assignee: Motorola, Inc., Schaumburg, IL (US)

( * ) Notice: Subject to any disclaimer, the term of this patent is extended or adjusted under 35 U.S.C. 154(b) by 228 days.

(21) Appl. No.: 09/986,241

(22) Filed: Oct. 22, 2001

(65) Prior Publication Data

US 2003/0079170 A1 Apr. 24, 2003

(51) Int. Cl.
*H03M 13/03* (2006.01)
(52) U.S. Cl. .................. 714/790; 714/755
(58) Field of Classification Search ............. 370/320, 370/414; 375/262; 714/746, 755, 758, 790, 714/784
See application file for complete search history.

(56) References Cited

U.S. PATENT DOCUMENTS

| | | | |
|---|---|---|---|
| 6,192,084 B1 | 2/2001 | Miyauchi et al. | |
| 6,339,834 B1 | 1/2002 | Crozier et al. | |
| 6,370,669 B1 | 4/2002 | Eroz et al. | |
| 6,430,722 B1 | 8/2002 | Eroz et al. | |
| 6,480,503 B1 * | 11/2002 | Yamaguchi et al. | 370/441 |
| 6,621,871 B2 * | 9/2003 | Ross | 375/262 |
| 6,744,744 B1 * | 6/2004 | Tong et al. | 370/320 |

OTHER PUBLICATIONS

3$^{rd}$ Generation Partnership Project, "Technical Specification Group Radio Access Network; Multiplexing and Channel Coding (FDD) (Release 1999)", TS 25.212 v3.5.0 (Dec. 2000).
3$^{rd}$ Generation Partnership Project, "Technical Specification Group Radio Access Network; High Speed Downlink Packet Access: Physical Layer Aspects (Release 5)", TR 25.858 v0.0.4 (Sep. 2001).
Samsung Electronics, "Simulation Results of Chase Combining with Symbol Mapping Based on Bit Priority", submission to 3GPP Technical Specification Group RAN WG1 AdHoc committee, R1-01-0739, Jun. 26, 2001.
Panasonic, "Enhanced HARQ Method with Signal Constellation Rearrangement", submission to 3GPP Technical Specification Group RAN WG1 AdHoc committee, R1-01-0237, Feb. 27, 2001.
"Liaison Statement on Progress with HSDPA", submission from 3GPP Technical Specification Group RAN WG1 to RAN WG2, R1-01-0945, Aug. 27, 2001.

* cited by examiner

*Primary Examiner*—Jacques Louis-Jacques
*Assistant Examiner*—Mujtabe K. Chaudry
(74) *Attorney, Agent, or Firm*—Brian M. Mancini; Randall S. Vaas

(57) ABSTRACT

A method of block puncturing for turbo code based incremental redundancy includes a first step (1200) of coding an input data stream into systematic bits and parity bits. A next step (1202) includes loading the systematic bits and parity bits into respective systematic and parity block interleavers in a column-wise manner. A next step (1204) includes selecting a predefined redundancy. A next step (1206) includes outputting bits from the block interleavers in a row-wise manner in accordance with the selected predefined redundancy.

18 Claims, 7 Drawing Sheets

FIG. 2
— PRIOR ART —
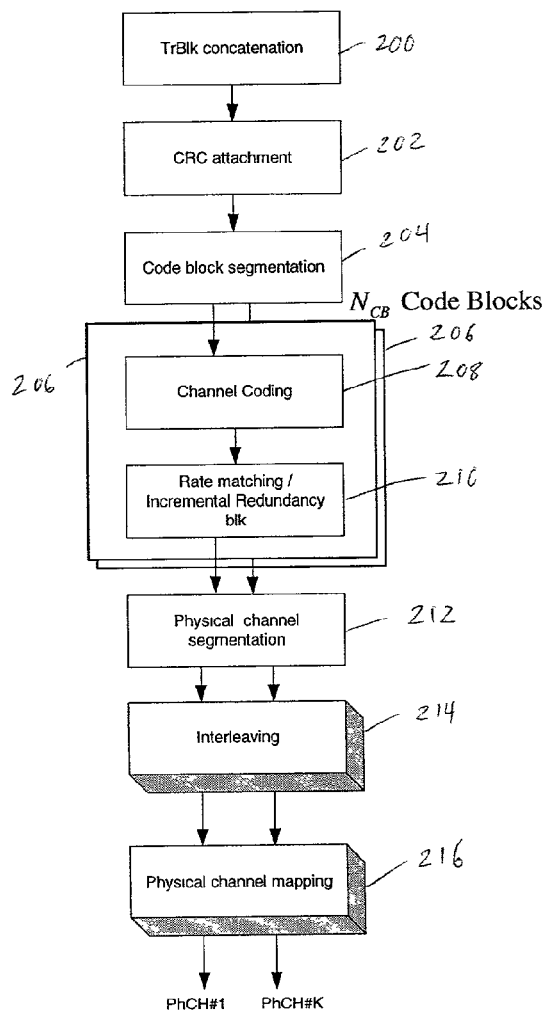
FIG. 3
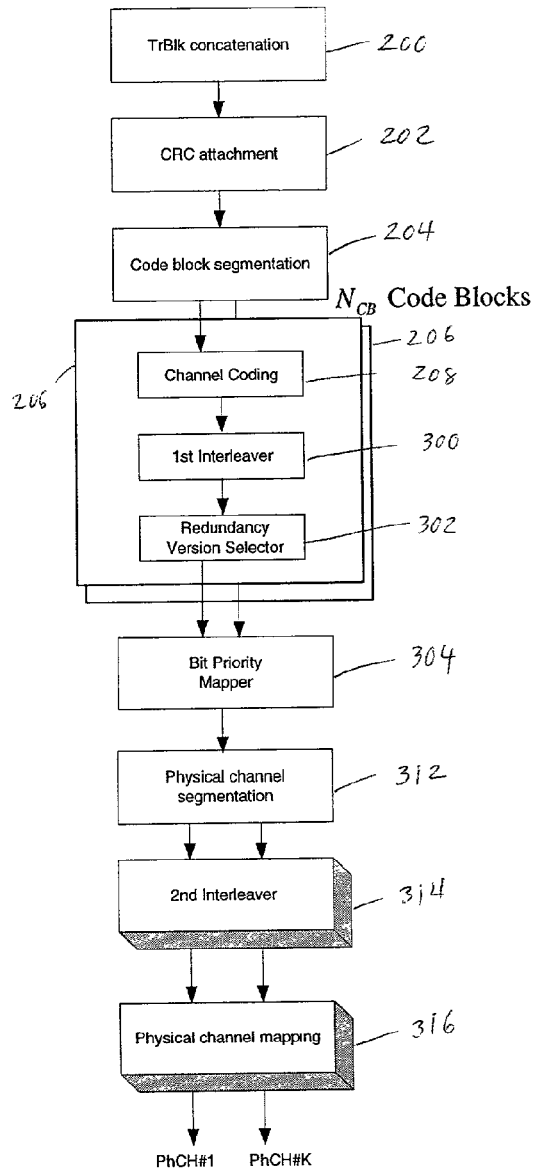
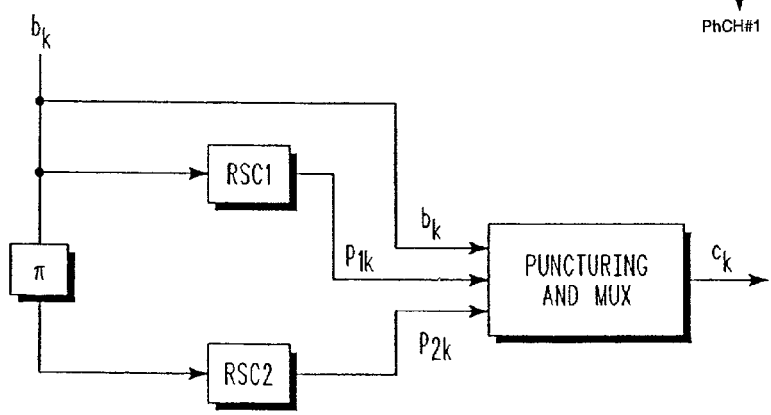
FIG. 1
— PRIOR ART —

$$P_1 = \begin{bmatrix} 1 & 1 & 1 & 1 & 1 & 1 \\ 0 & 0 & 1 & 0 & 0 & 0 \\ 0 & 0 & 0 & 0 & 0 & 0 \\ 0 & 0 & 0 & 0 & 0 & 0 \\ 0 & 0 & 0 & 0 & 0 & 1 \\ 0 & 0 & 0 & 0 & 0 & 0 \end{bmatrix}, P_2 = \begin{bmatrix} 0 & 0 & 0 & 0 & 0 & 0 \\ 1 & 0 & 0 & 0 & 1 & 0 \\ 0 & 1 & 0 & 1 & 0 & 0 \\ 0 & 0 & 0 & 0 & 0 & 0 \\ 0 & 0 & 1 & 0 & 0 & 1 \\ 0 & 0 & 1 & 0 & 0 & 1 \end{bmatrix}, P_3 = \begin{bmatrix} 0 & 0 & 0 & 0 & 0 & 0 \\ 0 & 0 & 1 & 0 & 0 & 1 \\ 0 & 0 & 1 & 0 & 0 & 1 \\ 0 & 0 & 0 & 0 & 0 & 0 \\ 1 & 0 & 0 & 0 & 1 & 0 \\ 0 & 1 & 0 & 1 & 0 & 0 \end{bmatrix}$$

FIG. 8

BLOCK PUNCTURING FOR TURBO CODE BASED INCREMENTAL REDUNDANCY

FIELD OF THE INVENTION

This invention relates generally to communication systems, and more particularly to coding in a turbo coded communication system.

BACKGROUND OF THE INVENTION

Convolutional codes are often used in digital communication systems to protect transmitted information from error. Such communication systems include the Direct Sequence Code Division Multiple Access (DS-CDMA) standard IS-95, the Global System for Mobile Communications (GSM), and next generation wideband communication systems. Typically in these systems, a signal is convolutionally coded into an outgoing code vector that is transmitted. At a receiver, a decoder, such as a Viterbi decoder as is known in the art, uses a trellis structure to perform an optimum search for the transmitted signal bits based on maximum likelihood criterion.

More recently, turbo codes have been developed that outperform conventional coding techniques. Turbo codes are generally composed of two or more convolutional codes and turbo interleavers. Correspondingly, turbo decoding is iterative and uses a soft output decoder to decode the individual convolutional codes. The soft outputs of the decoders are used in the decoding procedure to iteratively approach the converged final results.

FIG. 1 shows a typical turbo encoder that is constructed with one interleaver and two constituent codes which are recursive systematic convolutional (RSC) codes, but can be block codes, also. A turbo encoder is shown which is a parallel concatenation of two RSCs with an interleaver, $\pi$, between them. The output, $C_k$, of the turbo encoder is generated by multiplexing (concatenating) the information bits, $b_k$, and parity bits, $p_{1k}$ and $p_{2k}$, from the two encoders. Typically, the parity bits are punctured as is known in the art to increase code rate. Each RSC has a one parity bit output, but the number of parity bits of the RSC can be more than one.

Typically, the encoded data is transmitted to a receiver, which uses error detection. If an error is detected, the receiver can request that the transmitter, such as a base station for example, retransmit the data using an Automatic Repeat Request (ARQ). In other words, if a receiver is not able to resolve the data bits in time, the radio can request the transmitter to resend that portion of bits from the block or a portion of a frame of data that failed so as to be properly decoded. There are several known techniques to provide ARQ. In addition, there can be ARQ combining of different transmissions. Further, the receiver can attempt to provide error correction as well as error detection. This is referred to as a Hybrid Automatic Repeat Request (HARQ).

Two known forms of HARQ are Chase combining and Incremental Redundancy (IR). Chase combining is a simplified form of HARQ wherein the receiver simply requests a retransmission of the same codeword again. IR is more complicated in that it provides for a retransmission of the code word using more parity bits (that were punctured during the previous transmission), lowering the overall code rate. Conventional means of defining a puncturing pattern, such as a rate matching algorithm or alternatively a classical code puncturing matrix, as are known in the art, are unable to provide the necessary smooth and flexible transition between changing coding rates, as are envisioned for next generation communication products.

What is needed is an improved turbo coder that utilizes a unified puncturing scheme, which allows flexibility in choosing coding rates for the initial and subsequent transmissions. It would also be advantageous to provide this improvement using any of the combined ARQ techniques. It would also be of benefit to provide an improved turbo coder with a minimal increase of computational complexity or implementation effort.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 1 shows a simplified block diagram for a turbo encoder as is known in the prior art;

FIG. 2 shows a simplified flow chart for a prior art coding structure;

FIG. 3 shows a simplified flow chart for a coding structure, in accordance with the present invention;

FIG. 8 shows a matrix representation of a set of puncture matrices for IR combining;

DETAILED DESCRIPTION OF THE PREFERRED EMBODIMENT

Figure 4:
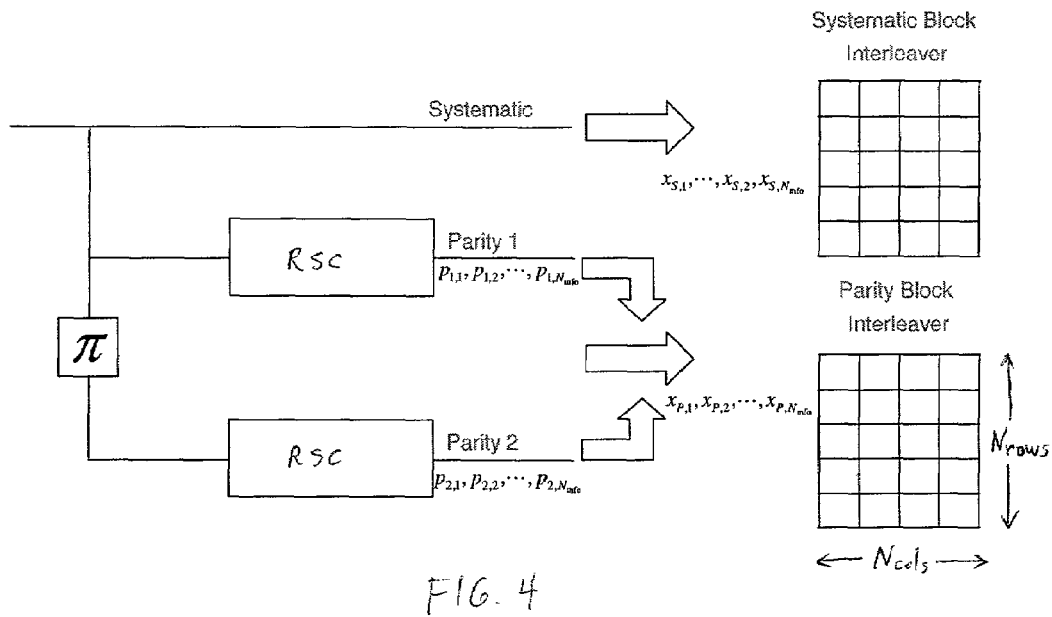
FIG. 4 shows a simplified block diagram for a turbo decoder, in accordance with the present invention.

The present invention provides a turbo coder that supports incremental redundancy (IR) as a form of ARQ combining, using a single, unified puncturing scheme. In particular, the present invention uses a puncturing scheme based on a block interleaver. Codeword bits are read in column-wise while the desired amount of unpunctured data is then read out row-wise after row and column rearrangement. The block nature of the interleaver ensures a regular puncturing distributed throughout the encoder trellis ensuring good code performance. The block puncturing approach of the present invention has the advantage of ease of implementation as well as retaining the flexibility in adapting to any desired coding rate without a significant increase in complexity. As a result, the present invention provides for flexible and fine-grained support of predefined redundancy versions at each transmission with progressive reduction in effective coding rates and support for full and partial forms of both Chase combining and IR. Preferably, the present invention also provides for symbol priority mapping onto the most reliable Quadrature Amplitude Modulation (QAM) constellation points to further reduce decoding errors.

In application, The High Speed Downlink Packet Access (HSDPA) feature of the Third Generation Partnership Project (3GPP) UTRA (UMTS Terrestrial Radio Access) or Wideband Code Division Multiple Access (WCDMA) system details a hybrid-ARQ scheme based on Incremental Redundancy (IR) methods applied to a rate-$\frac{1}{3}$ turbo-code. The present invention defines the High Speed Downlink Shared Channel (HS-DSCH) coding and modulation scheme to permit the use of incremental redundancy block interleaving in user equipment (UE), such as a cellular radio communication device. The present invention describes a specific method and apparatus for applying IR to HSDPA.

IR methods are known in the art, and have been applied before to systems such as Enhanced Data for GSM Evaluation (EDGE). However, the HSDPA problem is novel, in that the number of Soft Metric Locations (or SMLs) available to the Hybrid Acknowledge Repeat Request (HARQ) process can change depending on factors such as the number of ARQ processes in existence. The present invention allows for a change in the final coding rate according to the available coded symbol memory. Also, unlike the present invention, prior systems, such as EDGE, utilized convolutional codes rather than turbo-codes, and supported a different number of redundancy versions.

The present invention provides a flexible IR scheme specifically applicable to HSDPA. In particular, the IR scheme of the present invention supports: a) a flexible method of controlling the instantaneous and variable final code rate of the HARQ process (ranging from Chase combining to rate-$\frac{1}{3}$ expansion), b) general QAM modulation, including 16-QAM, c) a specific set of possible redundancy versions from which can be selected an optimal (or simply preferred) sequence of redundancy versions, based on the specific acknowledge/negative acknowledge (ACK/NACK) signal evolution applicable to HSDPA, and d) a novel implementation of block interleavers. Prior art implementations for IR, such as those of EDGE, do not meet the specific requirements of the current problem since they cannot change the final coding rate according to the available coded symbol memory. The terminal memory requirements of the user equipment are derived based on Chase (soft) combining at the maximum data rate defined by the associated UE capability parameters. In other words, the UE has memory limitations and can only accept particular code rates. The present invention accounts for these memory limitations and allows the UE to vary coding rates accordingly.

FIG. 2 shows the existing reference channel coding model for High Speed Downlink Packet Access (HSDPA) in accordance with the 3GPP specification protocols of section 4.2, "Technical Specification Group Radio Access Network; Multiplexing and Channel Coding (FDD) (Release 1999)", TS 25.212 v3.5.0 (2000-12), which is hereby incorporated by reference. At a first stage 200 data is input as a concatenated transport stream of data blocks. To this stream, cyclic redundancy check (CRC) is added 202, and then segmented 204 to produce $N_{CB}$ code blocks 206. The detailed functionality of these blocks 200-206 is presented in TS 25.212. At this point, each of the code blocks are individually subjected to channel coding 208 and rate matching 210 according to the puncturing and incremental redundancy used. The blocks are then subject to physical channel segmentation 212, interleaving 214, and physical channel mapping 216, where physical channels 1 through K are output.

FIG. 3 shows a channel coding model for HSDPA in accordance with the present invention. The first four operations (transport block concatenation 200, CRC attachment 202, code block segmentation 204, and channel coding 208) proceed according to the 3GPP protocols previously described. Preferably, channel coding 208 proceeds according to a channel coder operable at a rate-$\frac{1}{3}$ turbo encoding function. In addition, the last three stages (physical channel segmentation 312, (second) interleaver 314, and physical channel mapping 316) also proceed similarly to the 3GPP protocols with the exception of operation on symbols instead of bits. The present invention occurs in the first interleaver 300, redundancy version selection 302, and the optional bit priority mapper 304. The first interleaver includes the generalized rate matching function of the present invention based on a block interleaver that is easily implementable and offers good performance for all HARQ scenarios.

FIG. 4 shows the operation of the first interleaver (300 in FIG. 3) in entering a codeword into puncturing interleavers for the preferred turbo encoder. In the general turbo encoder case a codeword is separated into a "Systematic" stream and $N_{Parity}$ parity streams denoted by $x_{S,k}$, $p_{1,k}$, $p_{2,k}$, ..., $p_{Nparity,k}$ where $k \in \{1, ..., N_{info}\}$. Each stream is read into $N_{row} \times N_{col}$ block matrix interleavers. Preferably, the parity bits are combined into one $N_{row} \times N_{col}$ puncturing matrix, but separate $N_{row} \times N_{col}$ parity block interleavers can be used for each parity stream. In the preferred case of a single parity interleaver $x_{S,k} \in \{1,0\}$ and $x_{P,k}$ is an $N_{Parity}$ bit symbol $x_{P,k} = \{p_{1,k}, p_{2,k}, ..., p_{Nparity,k}\}$. In the case of the preferred turbo encoder of the present invention, the unpunctured codeword bits are bit separated into respective "Systematic", "Parity 1" and "Parity 2" streams denoted by $x_{S,k}$, $p_{1,k}$, $p_{2,k}$ where $k \in \{1, ..., N_{info}\}$. In the preferred case of a single parity interleaver, $x_{S,k} \in \{1,0\}$ and $x_{P,k} = \{p_{1,k}, p_{2,k}\}$ where $x_{P,k} \in \{\{1,0\}, \{0,1\}, \{1,0\}, \{1,1\}\}$. The tail bits from the coder are buffered separately and are later appended onto the unpunctured instantaneous codeword transmitted in a specific transmission time interval (TTI). The number of rows, $N_{row}$, and number of columns, $N_{col}$, in each interleaver can be variable and allocated dynamically. In a preferred embodiment, the number of rows, $N_{row}$, is always fixed at thirty, while the number of columns, $N_{col}$, is variable (dependent on the number of information bits $N_{info}$) and is determined in the same manner as the turbo code internal interleavers, such as is described in section 4.2.3.2.3.1 of "Technical Specification Group Radio Access Network; Multiplexing and Channel Coding (FDD) (Release 1999)", TS 25.212 v3.5.0 (2000-12), which is hereby incorporated by reference.

Figure 5:
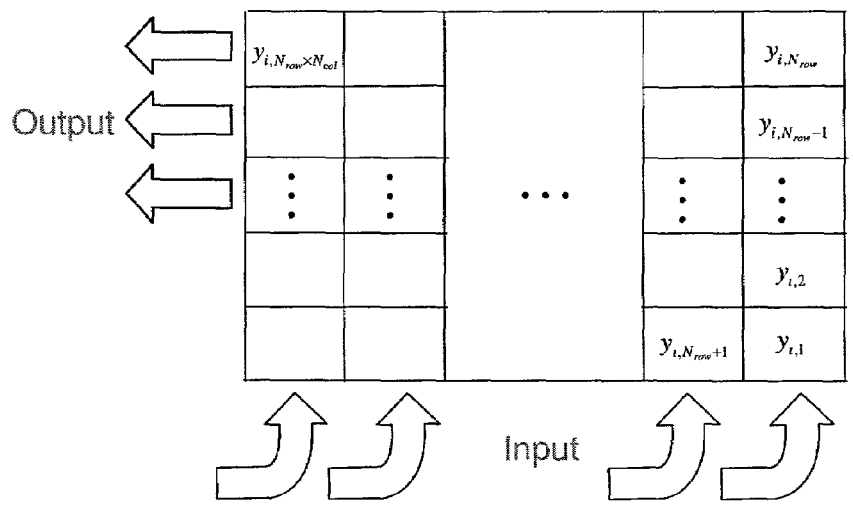
FIG. 5 shows a chart for block interleaver management, in accordance with the present invention.

FIG. 5 shows the data stream of the interleavers of FIG. 4. A novel aspect of the present invention is having data read in a column-wise fashion into each interleaver. The data includes dummy bits padded if $N_{info} < N_{row} \times N_{col}$, where $y_k = x_k$ for $k=1, 2, ..., N_{info}$ and $y_{S,k} \in \{0,1\}$ and $y_{P,k} \in \{\{1,0\}, \{0,1\}, \{1,0\}, \{1,1\}\}$ for $k = \{N_{info}+1, ..., N_{row} \times N_{col}\}$. These dummy bits are later removed when reading the codeword data row-wise from top-to-bottom from the block matrix, similar to the description in section 4.2.3.2.3.2 of TS 25.212, incorporated by reference.

To facilitate flexibility in supporting variable coding rates in the present invention, both columns and rows are permuted prior to reading out the block matrix contents. As an example of the benefit of row and column reordering, consider the case where $N_{row}=30$ and $N_{col}=100$. If the first two rows were to be read out without reordering, the codeword bits would correspond to the 29th, 30th, 59th, 60th, 89th, 90th, ... stages in the encoder trellis. However, by reordering row 29 with row 15, then the transmitted codeword bits become those at the 15th, 30th, 45th, 60th, 75th, 90th, ... stages in the encoder trellis, a more homogenous and therefore desirable distribution. In permuting the columns, it is ensured that no sub-block section of the trellis is neglected when only a portion of a row is read out to form the transmitted codeword. The row permutation is that defined by Table 7 in section 4.2.1.1 of TS 25.212, hereby incorporated by reference.

After the row and column permutation, the desired number of codeword bits can then be read out in row-wise fashion. Using the notation of FIG. 4, if the desired number of parity bits is an odd number and if $x_{P,k} = \{p_{1,k}, p_{2,k}\}$ is the last symbol read from the parity interleaver, then the parity bit $p_{1,k}$ is used as a codeword bit while the parity bit $p_{2,k}$ is discarded. In the case of the parity interleaver, the maximum number of rows that can be transmitted $N_{p,max\_row}$ may be less than $N_{row}$ due to UE memory restrictions, while for the systematic interleaver $N_{S,max\_row}$ is always equal to $N_{row}$. If $N_{SML}$ denotes the total number of Soft Metric Locations (SML's) provisioned at the UE, $N_{tail}$ denotes the number of tail bits per code block, and $N_{ARQ\_proc}$ denotes the number of ARQ processes currently defined in the UE, then $N_{p,max\_row}$ is given by;

$$N_{P,\max\_row} = \min\left(\left\lfloor \frac{N_{SML}}{2 \times N_{CB} \times N_{col} \times N_{ARQ\_proc}} - \frac{N_{row}}{2 \times N_{CB}} - \frac{N_{tail}}{2 \times N_{col} \times N_{CB}} \right\rfloor, N_{row}\right) \quad \text{(Eq. 1)}$$

Note that all the independent variables in Eq. (1) are derivable at the UE following delivery of the signaled Hybrid Automatic Repeat Request (HARQ) information on the High Speed Downlink Secondary Control Channel (HS-DSCCH). When more coded bits are required than can be obtained by reading to the end of the $N_{i,max\_row}{}^{th}$ row, $i \in \{S,P\}$, reading may continue by wrapping around to the beginning of the first row of the same or another interleaver. One consequence of this is to allow coding rates less than ⅓. Once the desired number of codeword bits is read from both block interleavers, the buffered tail bits are then appended completing the desired instantaneous codeword. The above equation defines the memory available to a UE (given that the systematic matrix is substantially fixed), and accounts for the available SML's per ARQ process. Using the above information a transmitting base station can choose the transmit rate suitable to work with the available memory by selecting particular block rows to output to fit the chosen rate, as will be described below. Rate selection occurs as follows, both puncturing matrices are filled up and then only the codeword bits that are unpunctured are read out. The punctured bits are the ones that are left. Rate selection therefore occurs as a result of redundancy version (tells which row to start reading from) and the first interleaver (gives the order bits should be read out). Moreover, the block interleaver is not used in conventional block interleaving per se, but is used to select rows from the block that are not punctured.

Referring back to FIG. 3, the present invention also incorporates a redundancy version selector 302. Since a different number of codeword bits may be obtained from the systematic and parity block interleavers, the framework of the present invention allows for both Chase and incremental redundancy (IR) coding schemes. In order to support different redundancy versions, any row of any block puncturing interleaver may be assigned as a starting point at which to commence the readout of codeword bits. By defining multiple starting points for one redundancy version, the order and/or the ratio in which codeword bits are be read out from the systematic and parity interleavers can provide further degrees of freedom in describing any potential redundancy version. The set of redundancy versions defined between the Node B and UE can be of any size, and may vary dynamically or semi-statically in size and form (e.g. through explicit signaling of redundancy versions or a subset of a pre-agreed redundancy versions between the Node B and UE) or as in the preferred implementation shown in FIG. 6.be derived from a pre-defined static set. Although, smaller or larger sets of redundancy versions can be used, the eight redundancy versions ($RV_i, i \in \{0, \ldots, 7\}$) shown require three bits for signaling in the HS-DSCCH with the following preferred rules used to define all the versions shown.

Rule 1: Each rectangle represents rows 1 to $N_{i,max\_row}$ for $i \in \{S,P\}$.

Rule 2: The X (e.g. RV1, RV2, RV3) inside an interleaver signifies no bits are used from that interleaver to form the instantaneous codeword.

Rule 3: The double arrowed line inside an interleaver signifies all bits in 1 to $N_{i,max\_row}$ in that block interleaver must be transmitted exactly once (e.g. RV0).

Rule 4: In the case there is an X in one interleaver and a single arrowed line in the other, then codeword bits are only read from the block interleaver with the single arrowed line.

Rule 5: In the case there is a double arrowed line in one interleaver and a single arrowed line in the other, then codeword bits are only read from the block interleaver with the single arrowed line once reading from the double arrowed line is complete.

Rule 6: In the case there is a single arrowed line in both interleavers, then codeword bits are read equally from both block interleavers.

Rule 7: If reading from a block interleaver with a single arrowed line has reached the end of line $N_{i,max\_row}$ but more codeword bits are required, then reading wraps around to line 1.

Rule 8: A fractional number $N_{frac\_num}$ beside the starting row of a single arrowed line indicates that starting row as $N_{frac\_num} \times N_{i,max\_row}$.

In general, the predefined redundancy comprises a redundancy version for the coded bits of the block interleavers wherein the redundancy version sets one or more starting rows $\alpha_{i,j}$ for each redundancy version j, where $i \in \{S,P\}$ and $\alpha_{i,j} \in \{1, \ldots, N_{i,max\_row}\}$ and reads the coded bits from the selected starting rows in a pre-defined order and ratio, wherein if the end of the $N_{i,max\_row}$th interleaver is reached, reading shall continue from the first row of a predefined interleaver which includes one of the systematic and parity block interleavers. The set of redundancy versions may be of any size and may be constructed on a static, semi-static or variable basis.

Figure 6:
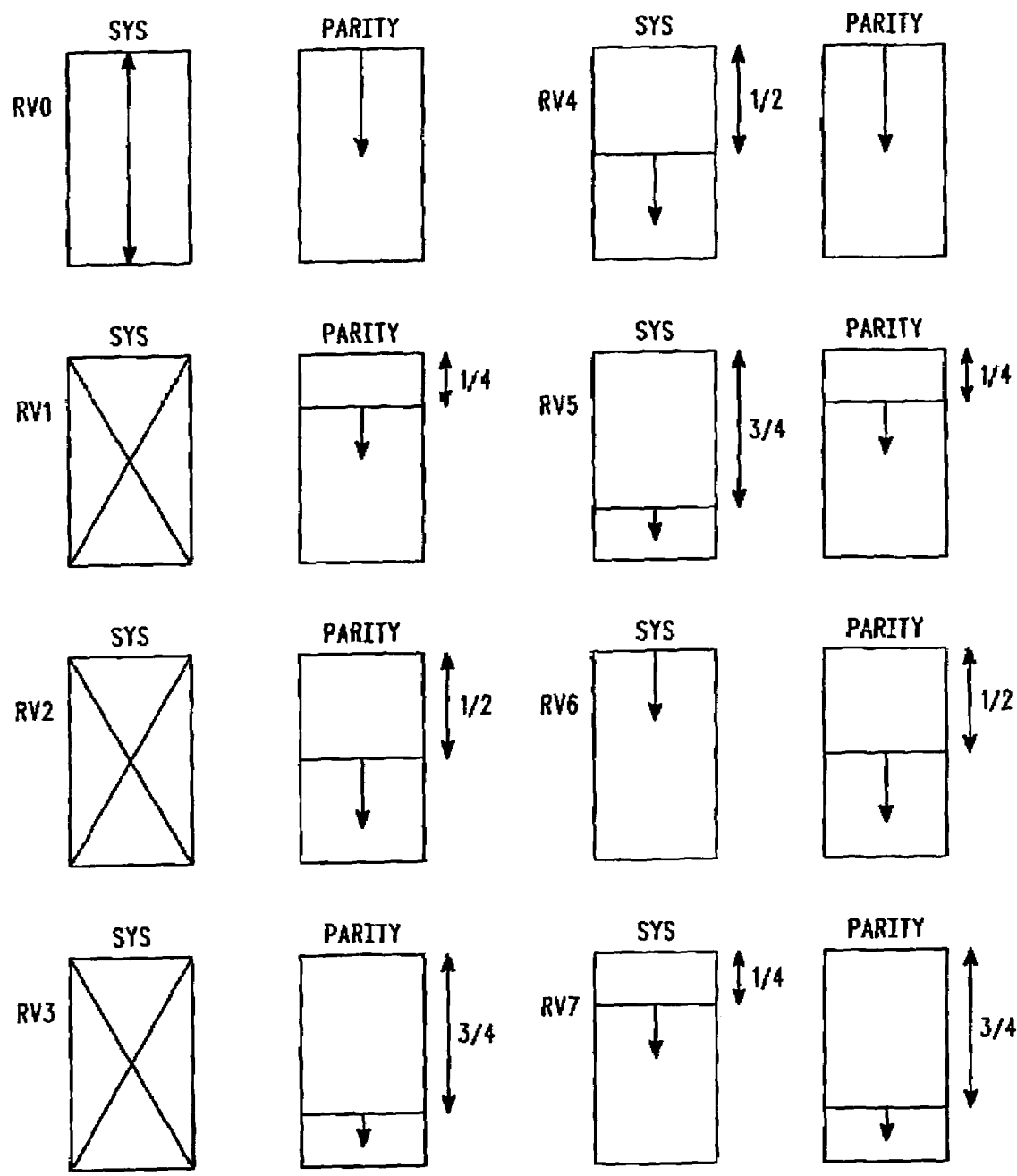
FIG. 6 shows simplified graphic representation for redundancy version, in accordance with the present invention.

The present invention includes a preferred set of eight redundancy versions for selecting coded bits from the systematic and parity interleavers in accordance with the above rules, as shown in FIG. 6 and as described below.

Redundancy version zero: the starting row is the top row of both the systematic and parity interleavers, and coded bits from the systematic interleaver is read from its starting row to completion before the remaining coded bits are read from the parity interleaver starting at its starting row.

Redundancy version one: the starting row is $N_{p,max\_row}/4$ for the parity interleaver, and the coded bits are read from the parity interleaver starting at its starting row.

Redundancy version two: the starting row is $N_{p,max\_row}/2$ for the parity interleaver, and the coded bits are read from the parity interleaver starting at its starting row.

Redundancy version three: the starting row is $3 \times N_{p,max\_row}/4$ for the parity interleaver, and the coded bits are read from the parity interleaver starting at its starting row.

Redundancy version four: the respective starting rows are the top row of the parity interleaver and $N_{S,max\_row}/2$ for the systematic interleaver, and the coded bits are read equally from the systematic and parity interleaver starting at their respective starting rows.

Redundancy version five: the respective starting rows are $N_{p,max\_row}/4$ for the parity interleaver and $3 \times N_{S,max\_row}/4$ for the systematic interleaver, and the coded bits are read equally from the systematic and parity interleaver starting at their respective starting rows.

Redundancy version six: the respective starting rows are the top row of the systematic interleaver and $N_{p,max\_row}/2$ for the parity interleaver, and the coded bits are read equally from the systematic and parity interleaver starting at their respective starting rows.

Redundancy version seven: the respective starting rows are $3 \times N_{p,max\_row}/4$ for the parity interleaver and $N_{S,max\_row}/4$ for the systematic interleaver, and the coded bits are read equally from the systematic and parity interleaver starting at their respective starting rows.

One aspect of these redundancy versions in the present invention is that their numbering does not suggest a particular order of transmission. For example, if on the first transmission RV0 is signaled with enough codeword bits to result in a rate ⅗ code (exactly one third of the parity bits transmitted, e.g. one third of "Parity 1" and one third of "Parity 2" stream in the preferred turbo encoder case), the scheduler is permitted choose RV2 for the second transmission. Similarly, if in the first transmission, a rate ¼ code is desired, RV4 might be selected for the second transmission. Moreover, systematic bits can be used in the first selected and unpunctured rows and parity bits in subsequent and punctured rows to reduce error. Using this approach, the chosen redundancy version can be used to support Chase, partial and full IR schemes in conjunction with any adaptive modulation and coding scheme (AMCS). Note that the sequence of redundancy versions to be transmitted is dependent on the scheduler, traditionally located in the Node B (Base Station).

Referring back to FIG. 3, a preferred embodiment of the present invention incorporates a bit priority mapper (BPM), which further improves the performance of IR. Priority bit mapping is based on utilizing the differing bit reliability offered by higher order constellations (16-QAM or higher). It is well known that systematic portions of a turbo codeword are of greater importance to decoder performance than the parity portions. It naturally follows that system performance can be further improved by placing systematic bits in positions of high reliability if a higher order constellation is used.

The symbol mapping is dependent on the type of modulation and the number of systematic and parity bits used in transmission. As an example, if redundancy version 0 (RV0) is used with an effective code rate of ¾ and 16-QAM modulation, each QAM symbol comprises of three systematic bits and one parity bit, while if the same version is used with a code rate of ½ and 16-QAM modulation, each QAM symbol then comprises of two systematic and 2 parity bits.

Figure 7:
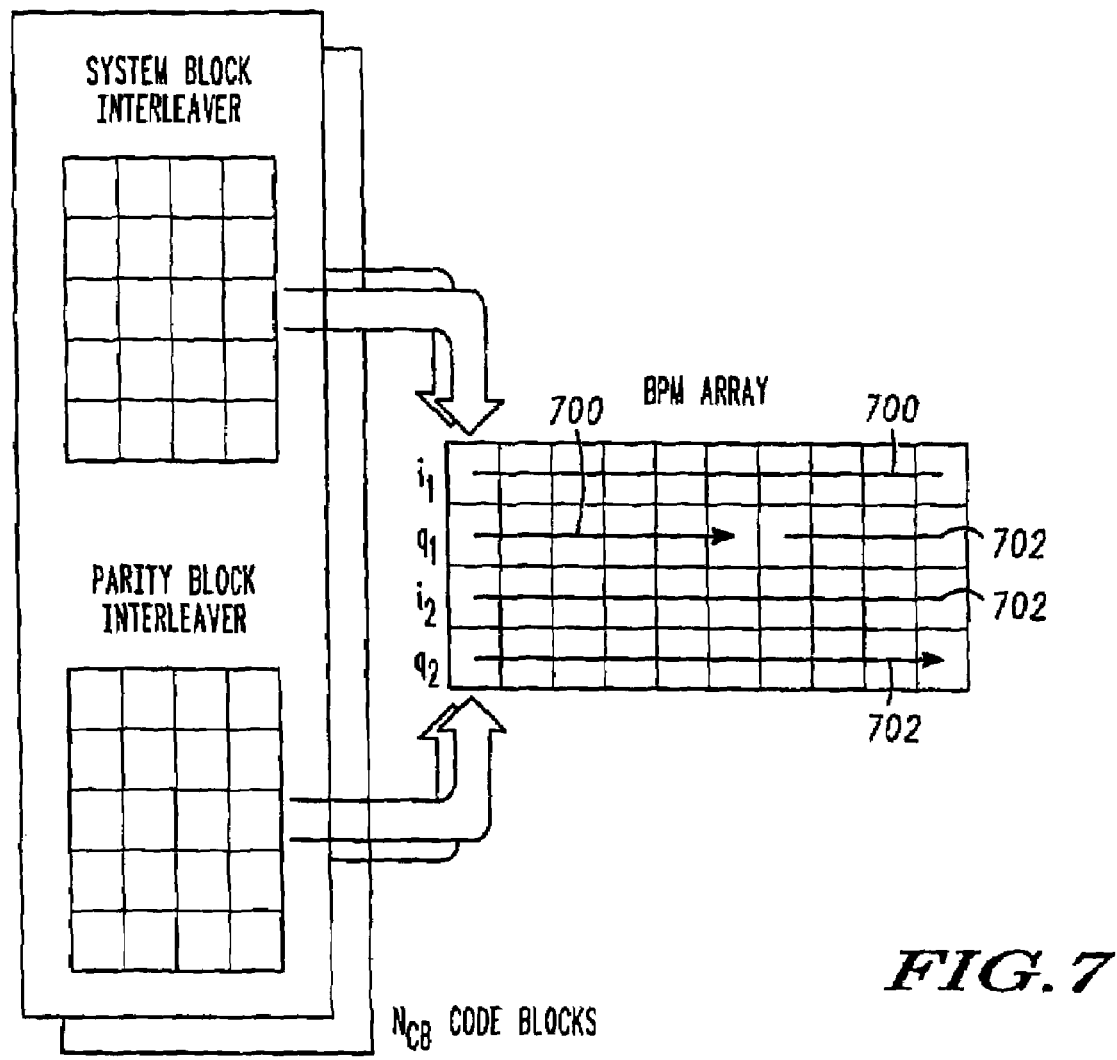
FIG. 7 shows a chart for bit priority mapping, in accordance with the present invention.

FIG. 7 shows an example of the proposed priority bit mapping for the case of 16-QAM modulation where a grouping of four bits is used to define one symbol. Here, the four bits are denoted $i_1$, $q_1$, $i_2$, $q_2$ with bits $i_1$ and $q_1$ offering greater reliability than bits $i_2$ and $q_2$ due to the nature of the constellation, as is known in the art. Codeword bits are taken from the systematic and parity puncturing block interleavers and read into the BPM array in a row-wise manner. The number of rows $N_{row\_BPM}$ of the BPM array is equal to $\log_2(M)$ where M is the constellation order, or $N_{row\_BPM} = \log_2(16) = 4$ in the case of 16-QAM. The number of columns is $N_{col\_BPM} = 480 \times K$ where K is the number of physical channels, as shown in FIGS. 2 and 3, and 480 is the number of modulated symbols on each channel.

Systematic codeword bits 700 are read code block-wise and then from left-to-right into the BPM array. Once all systematic codeword bits 700 have been read in, parity codeword bits 702 are read in, continuing from where the systematic codeword bits left off, again code block-wise and then from left-to-right. In the case of full IR where no systematic bits form part of the transmission codeword, only parity codeword bits fill up the BPM (code block-wise and then from left-to-right). The output of the BPM is a sequence of QAM symbols or bit vectors (a vector of four bits in the case of 16-QAM and a vector of two bits in the case of QPSK) given by the columns of the BPM array, read in sequence from left-to-right. Advantageously, this results in systematic bits 700 being mapped into the first rows of the bit mapper followed by subsequent mapping of parity bits. Alternately reversing codeword bit reliability during re-transmissions can result in further performance improvements. In particular, this principle can be applied to the BPM by reversing the sequence of high and low priority bits, incurring the extra bit required to signal this reversal to the UE.

Referring back to FIG. 3, the physical channel segmentation 312 proceeds according to the 3GPP protocol of section 4.2.10 of TS 25.212, incorporated by reference, but with a modification. Instead of applying the algorithm on bits as in section 4.2.10, it is applied on the QAM symbols/bit vectors output from the BPM described above.

Following channel segmentation 312, second interleaving 314, as described in section 4.2.11 in TS 25.212 is applied, again with a modification. In this case, instead of applying the interleaver on the bits comprising each physical channel, it is applied on the QAM symbols values or symbol indices of each of the physical channel which are output from the physical channel segmentation 312.

Finally and similarly, the physical channel mapping 314 described in section 4.2.12 of TS 25.212 is applied, again with substitution of QAM data symbols for bits.

FIG. 8 shows a matrix representation of a set of puncture matrices for IR combining.

EXAMPLE

Figure 9:
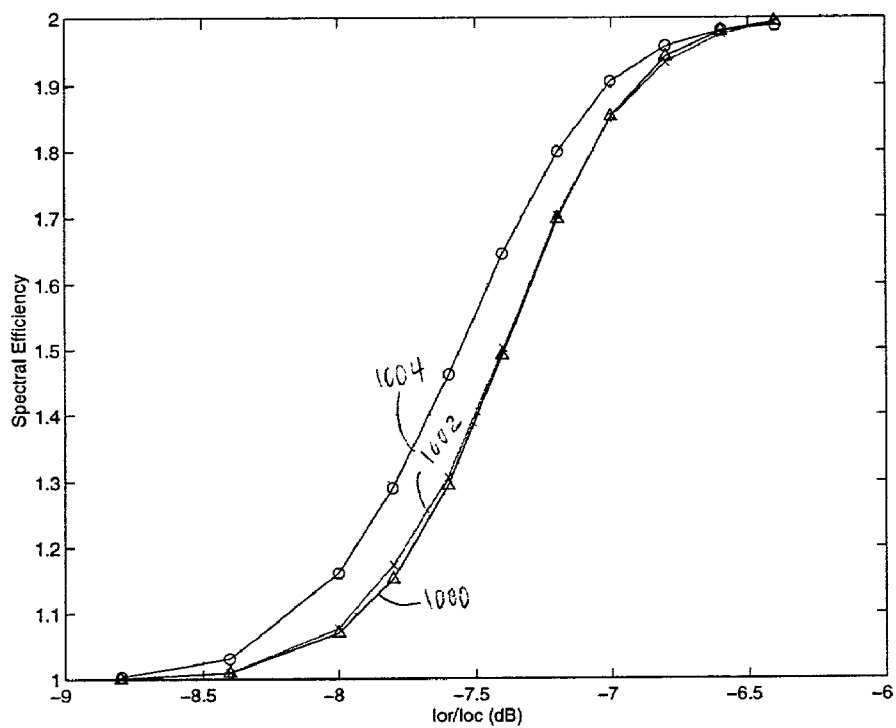
FIG. 9 shows a first graphical representation of the improvement provided by the present invention.

The block-puncturing technique of the present invention was compared to that traditionally defined by puncturing matrices. Simulations were conducted for a rate-½ 16-QAM coding and for a rate ¾ QPSK coding for both Chase and full IR combining. FIG. 9 shows three curves representing spectral efficiency versus Ior (power spectral density) at the base station over Ioc (total noise power) for the a rate-½, N=600, 16-QAM coding, over a Average White Gaussian Noise (AWGN) channel. The first curve 1000 represents the spectral efficiency of a signal using the traditional method of puncturing. The second curve 1002 represents the spectral efficiency of a signal using block puncturing in accordance with the present invention. The third curve 1004 represents the spectral efficiency of a signal using block puncturing and symbol mapping, in accordance with a preferred embodiment of the present invention. As can be seen there is no loss between traditional and block puncturing methods of the present invention, while the use of symbol mapping gives a significant advantage for 16QAM.

Figure 10:
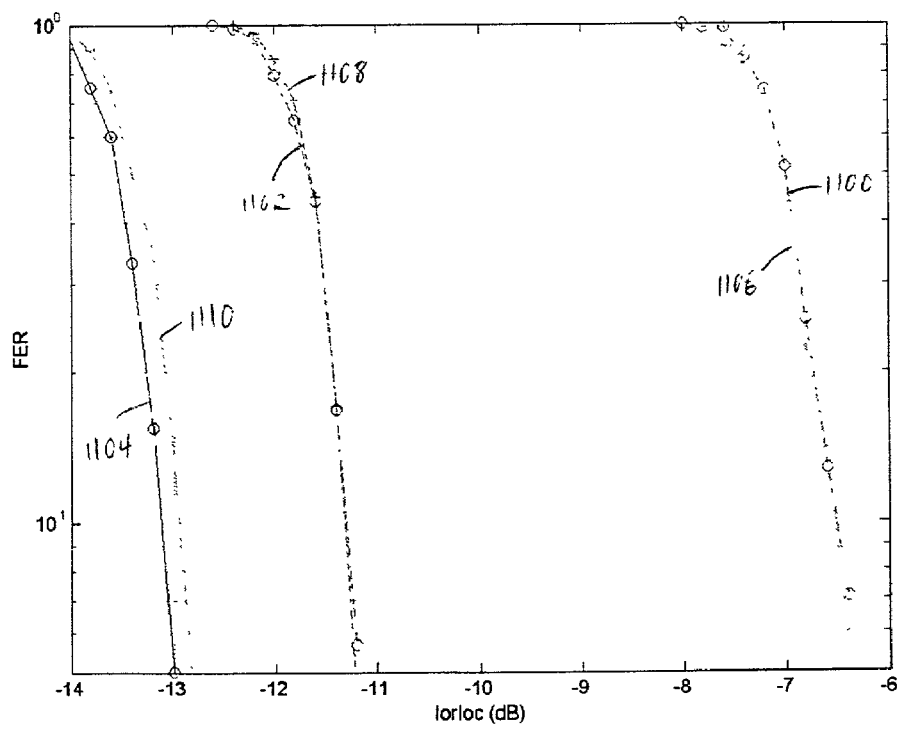
FIG. 10 shows a first graphical representation of the improvement provided by the present invention.

FIG. 10 shows the simulated error for a rate ¾ QPSK coding for full IR combining. There is no explicit puncturing. Only the bits that are considered unpunctured are read out from the interleaver, where the puncturing matrices for the respective first, second and third block transmissions are shown in FIG. 8, respectively for example. For the purposes of comparison, the same number of unpunctured bits was used for all transmissions, though the block-puncturing scheme of the present invention allows for variable transmission lengths.

The simulation was conducted to determine frame error rate (FER) for a Quadrature Phase Shift Keying (QPSK) signal at a ¾ rate with a spreading factor (SF) of 16 and Orthogonal Variable Spreading Factor (OVSF) of 1 over an AWGN channel. The first curve 1100 shows the ER of the traditional IR scheme with one transmission (Chase combining). The second curve 1102 shows the FER of the traditional IR scheme with two transmissions. The third curve 1104 shows the FER of the traditional IR scheme with three transmissions. In comparison, and in accordance with the present invention, the fourth curve 1106 shows the FER of the block puncturing IR scheme with one transmission, the fifth curve 1108 shows the FER of the block puncturing IR scheme with two transmissions, and sixth curve 1110 shows the FER of the block puncturing IR scheme with three transmissions.

As can be seen, the block puncturing of the present invention shows no loss of performance for IR. Only for the third transmission is there a slight loss in performance of the proposed block-puncturing scheme versus the more traditional yet very inflexible matrix based traditional puncturing approach. Considering the flexibility and overall improvement provided by the present invention, this is quite acceptable. Moreover, symbol remapping may be used to alleviate deficiency.

Figure 11:
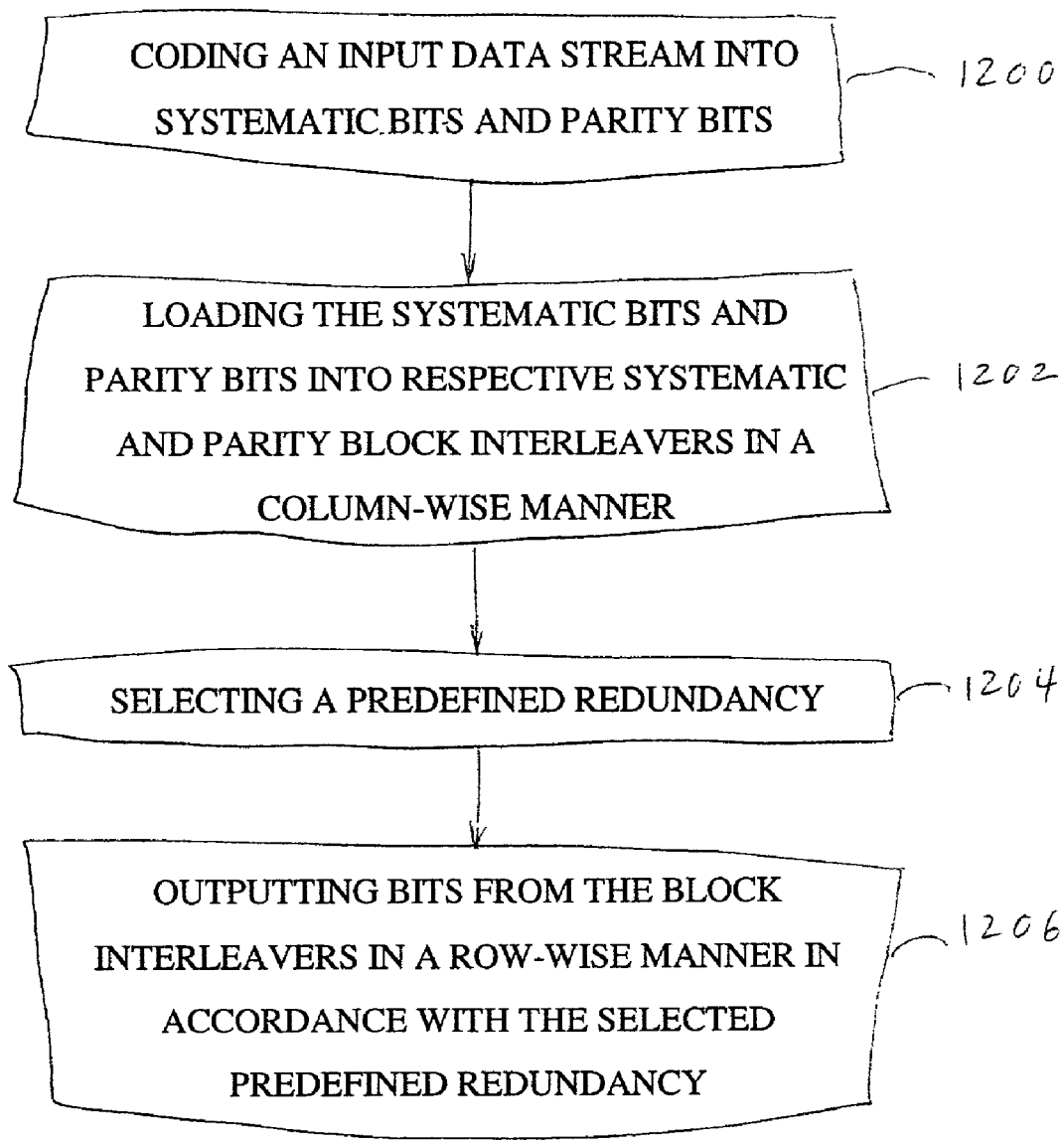
FIG. 11 shows a simplified flow chart of a method, in accordance with the present invention.

FIG. 11 shows a flow chart representing a method of block puncturing for turbo code based incremental redundancy, in accordance with the present invention. A first step of the method is coding 1200, such as turbo coding, an input data stream into systematic bits and parity bits. A next step is loading 1202 loading the systematic bits and parity bits into respective systematic and parity block interleavers in a column-wise manner, as described previously. A next step is selecting 1204 a predetermined redundancy. This step ibilows the redundancy rules previously described, and preferably utilizes the specific redundancy version outlined above. A next step is outputting 1206 data from the block interleavers in a row-wise manner in accordance with the selected redundancy. Preferably, a outputting step includes mapping the bits from the systematic and parity block into a symbol mapping array wherein the systematic bits are mapped into the upper rows of the array and the parity bits are mapped into the lower rows of the array. This is followed by a step of selecting (not shown) the final code rate dependant upon the available symbol memory, as defined by Eq. 1.

Although the invention has been described and illustrated in the above description and drawings, it is understood that this description is by way of example only and that numerous changes and modifications can me made by those skilled in the art without departing from the broad scope of the invention. Although the present invention finds particular use in portable cellular radiotelephones, the invention could be applied to any two-way wireless communication device, including pagers, electronic organizers, and computers. Applicants' invention should be limited only by the following claims.

What is claimed is:

1. A method of block puncturing for turbo code based incremental redundancy, the method comprising the steps of:
   coding an input data stream into systematic bits and parity bits;
   loading the systematic bits and parity bits into respective systematic and parity block interleavers in a column-wise manner;
   selecting a redundancy; and
   outputting bits from the block interleavers in a row-wise manner in accordance with the selected redundancy; and
   further comprising the step of selecting a coding rate dependant upon available symbol memory as defined by the equation $$N_{P,\max\_row} = \min\left(\left[\frac{N_{SML}}{2 \times N_{CB} \times N_{col} \times N_{ARQ\_proc}} - \frac{N_{row}}{2 \times N_{CB}} - \frac{N_{tail}}{2 \times N_{col} \times N_{CB}}\right], N_{row}\right)$$

where $N_{p,max\_row}$ the maximum number of rows in the parity block interleaver that can be transmitted, $N_{SML}$ is the total number of Soft Metric Locations provisioned at the user equipment, $N_{CB}$ is the number of code blocks, $N_{col}$ is the number of columns in the parity block interleaver, $N_{row}$ is the number of rows in the parity block interleaver, $N_{tail}$ is the number of tail bits per code block, $N_{ARQ\_PROC}$ is the number of ARQ processes currently defined in the user equipment, and given that the size of the systematic block interleaver is substantially fixed.

2. The method of claim 1, wherein the outputting step includes mapping the bits from the systematic and parity block interleavers into a symbol mapping array wherein the systematic bits are mapped into the upper rows of the array and the parity bits are mapped into the lower rows of the array.

3. The method of claim 2, wherein in the mapping step the upper rows of the array have a higher priority than the lower rows of the array, such that the systematic bits in a symbol has a higher priority than the parity bits in a symbol.

4. The method of claim 2, wherein in the mapping step the upper rows of the array have a higher priority than the lower rows of the array, such that the systematic bits in a symbol has a higher priority than the parity bits in a symbol.

5. A method of block puncturing for turbo code based incremental redundancy, the method comprising the steps of:
   coding an input data stream into systematic bits and parity bits;
   loading the systematic bits and parity bits into respective systematic and parity block interleavers in a column-wise manner;
   selecting a redundancy; and
   outputting bits from the block interleavers in a row-wise manner in accordance with the selected redundancy; and
   wherein the selecting step includes implementing a redundancy version for selecting coded bits from the block interleavers, the redundancy version includes substeps of:

setting of one or more starting rows $\alpha_{i,j}$ for each redundancy version j, where $i \in \{S,P\}$ and $\alpha_{i,j} \in \{1, \ldots, N_{i,max\_row}\}$; and reading the coded bits from the selected starting rows in a pre-defined order and ratio, wherein if the end of the $N_{i,max\_row}{}^{th}$ interleaver is reached, reading shall continue from the first row of at least one of said interleavers.

6. The method of claim 5, wherein the outputting step includes mapping the bits from the systematic and parity block interleavers into a symbol mapping array wherein the systematic bits are mapped into the upper rows of the array and the parity bits are mapped into the lower rows of the array.

7. The method of claim 6, wherein in the mapping step the upper rows of the array have a higher priority than the lower rows of the array, such that the systematic bits in a symbol has a higher priority than the parity bits in a symbol.

8. The method of claim 6, wherein in the mapping step the upper rows of the array have a higher priority than the lower rows of the array, such that the systematic bits in a symbol has a higher priority than the parity bits in a symbol.

9. A method of block puncturing for turbo code based incremental redundancy, the method comprising the steps of:

coding an input data stream into systematic bits and parity bits;

loading the systematic bits and parity bits into respective systematic and parity block interleavers in a column-wise manner;

selecting a redundancy; and outputting bits from the block interleavers in a row-wise manner in accordance with the selected redundancy; and wherein the selecting step includes implementing a redundancy version for selecting coded bits from one of the group of:

setting the starting rows as the respective top rows of both the systematic and parity interleavers, and reading the coded bits of the systematic interleaver from its respective starting row to completion before the remaining coded bits are read from the parity interleaver starting at its respective starting row;

setting the starting row as $N_{p,max\_row}/4$ of the parity interleaver, and reading the coded bits from the parity interleaver starting at its starting row;

setting the starting row as $N_{p,max\_row}/2$ for the parity interleaver, and reading the coded bits from the parity interleaver starting at its starting row;

setting the starting row as $3 \times N_{p,max\_row}/4$ for the parity interleaver, and reading the coded bits from the parity interleaver starting at its starting row;

setting the starting rows as the top row of the parity interleaver and $N_{s,max\_row}/2$ for the systematic interleaver, and reading the coded bits equally from the systematic and parity interleaver starting at its their respective starting rows;

setting the starting rows as $N_{p,max\_row}/4$ for the parity interleaver and $3 \times N_{S,max\_row}/4$ for the systematic interleaver, and reading the coded bits equally from the systematic and parity interleaver starting at their respective starting rows;

setting the starting rows as the top row of the systematic interleaver and $N_{p,max\_row}/2$ for the parity interleaver, and reading the coded bits equally from the systematic and parity interleaver starting at their respective starting rows; and setting the starting rows as $3 \times N_{p,max\_row}/4$ for the parity interleaver and $N_{Smax\_row}/4$ for the systematic interleaver, and reading the coded bits equally from the systematic and parity interleaver starting at their respective starting rows.

10. The method of claim 9, wherein the outputting step includes mapping the bits from the systematic and parity block interleavers into a symbol mapping array wherein the systematic bits are mapped into the upper rows of the array and the parity bits are mapped into the lower rows of the array.

11. The method of claim 10, wherein in the mapping step the upper rows of the array have a higher priority than the lower rows of the array, such that the systematic bits in a symbol has a higher priority than the parity bits in a symbol.

12. The method of claim 10, wherein in the mapping step the upper rows of the array have a higher priority than the lower rows of the array, such that the systematic bits in a symbol has a higher priority than the parity bits in a symbol.

13. A method of block puncturing for turbo code based incremental redundancy, the method comprising the steps of:

turbo coding an input data stream into systematic bits and parity bits;

loading the systematic bits and parity bits into respective systematic and parity block interleavers in a column-wise manner;

selecting a redundancy; and mapping the bits from the systematic and parity block interleavers into a symbol mapping array in a row-wise manner in accordance with the selected redundancy, wherein the systematic bits are mapped into the upper rows of the array and the parity bits are mapped into the lower rows of the array, further comprising the step of selecting a coding rate dependant upon available symbol memory as defined by the equation $$N_{P,\max\_row} = \min\left(\left[\frac{N_{SML}}{2 \times N_{CB} \times N_{col} \times N_{ARQ\_proc}} - \frac{N_{row}}{2 \times N_{CB}} - \frac{N_{tail}}{2 \times N_{col} \times N_{CB}}\right], N_{row}\right)$$

where $N_{p,max\_row}$ the maximum number of rows in the parity block interleaver that can be transmitted, $N_{SML}$ is the total number of Sofi Metric Locations provisioned at the user equipment, $N_{CB}$ is the number of code blocks, $N_{col}$ is the number of columns in the parity block interleaver, $N_{row}$ is the number of rows in the parity block interleaver, $N_{tail}$ is the number of tail bits per code block, $N_{ARQ\_proc}$ is the number of ARQ processes currently defined in the user equipment, and given that the size of the systematic block interleaver is substantially fixed.

14. A method of block puncturing for turbo code based incremental redundancy, the method comprising the steps of:

turbo coding an input data stream into systematic bits and parity bits;

loading the systematic bits and parity bits into respective systematic and parity block interleavers in a column-wise manner;

selecting a redundancy; and mapping the bits from the systematic and parity block interleavers into a symbol mapping array in a row-wise manner in accordance with the selected redundancy, wherein the systematic bits are mapped into the upper rows of the array and the parity bits are mapped into the lower rows of the array;

wherein the selecting step includes implementing a redundancy version for selecting coded bits from the block interleavers the redundancy version includes substeps of:

setting of one or more starting rows $\alpha_{i,j}$ for each redundancy version j, where $i \in \{S,P\}$ and $\alpha_{i,j} \in \{1, \ldots, N_{i,max\_row}\}$; and reading the coded bits from the selected starting rows in a pre-defined order and ratio, wherein if the end of the $N_{i,max\_row}{}^{th}$ interleaver is reached, reading shall continue from the first row of at least one of said interleavers.

15. A method of block puncturing for turbo code based incremental redundancy, the method comprising the steps of:

turbo coding an input data stream into systematic bits and parity bits;

loading the systematic bits and parity bits into respective systematic and parity block interleavers in a column-wise manner;

selecting a redundancy; and mapping the bits from the systematic and parity block interleavers into a symbol mapping array in a row-wise manner in accordance with the selected redundancy, wherein the systematic bits are mapped into the upper rows of the array and the parity bits are mapped into the lower rows of the array;, wherein the selecting step includes implementing a redundancy version for selecting coded bits from the systematic and parity interleavers from one of the group of:

setting the starting rows as the respective top rows of both the systematic and parity interleavers, and reading the coded bits of the systematic interleaver from its respective starting row to completion before the remaining coded bits are read from the parity interleaver starting at its respective starting row;

setting the starting row as $N_{p,max\_row}/4$ of the parity interleaver, and reading the coded bits from the parity interleaver starting at its starting row;

setting the starting row as $N_{p,max\_row}/2$ for the parity interleaver, and reading the coded bits from the parity interleaver starting at its starting row;

setting the starting row as $3 \times N_{p,max\_row}/4$ for the parity interleaver, and reading the coded bits from the parity interleaver starting at its starting row;

setting the starting rows as the top row of the parity interleaver and $N_{S,max\_row}/2$ for the systematic interleaver, and reading the coded bits equally from the systematic and parity interleaver starting at its their respective starting rows;

setting the starting rows as $N_{p,max\_row}/4$ for the parity interleaver and $3 \times N_{Smax\_row}/4$ for the systematic interleaver, and reading the coded bits equally from the systematic and parity interleaver starting at their respective starting rows;

setting the starting rows as the top row of the systematic interleaver and $N_{p,max\_row}/2$ for the parity interleaver, and reading the coded bits equally from the systematic and parity interleaver starting at their respective starting rows; and setting the starting rows as $3 \times N_{p,max\_row}/4$ for the parity interleaver and $N_{S,max\_row}/4$ for the systematic interleaver, and reading the coded bits equally from the systematic and parity interleaver starting at their respective starting rows.

16. A turbo coder with block puncturing for incremental redundancy, comprising:

a channel coder operable to code an input data stream into systematic bits and parity bits;

a first interleaver coupled to the channel coder, the first interleaver operable to load the systematic bits and parity bits into respective systematic and parity block interleavers in a column-wise manner;

a redundancy version selector coupled to the first interleaver, the redundancy version selector operable to select a redundancy;

a bit priority mapper coupled to the redundancy version selector, the bit priority mapper operable to map bits from the block interleavers in a row-wise manner in accordance with the selected redundancy, further comprising a symbol memory, and wherein the redundancy version selector also selects a. coding rate dependant upon available symbol memory as defined by the equation $$N_{P,max\_row} = \min\left(\left[\frac{N_{SML}}{2 \times N_{CB} \times N_{col} \times N_{ARQ\_proc}} - \frac{N_{row}}{2 \times N_{CB}} - \frac{N_{tail}}{2 \times N_{col} \times N_{CB}}\right], N_{row}\right)$$

where $N_{p,max\_row}$ the maximum number of rows in the parity block interleaver that can be transmitted, $N_{SML}$ is the total number of Sofi Metric Locations provisioned at the user equipment, $N_{CB}$ is the number of code blocks, $N_{col}$ is the number of columns in the parity block interleaver, $N_{row}$ is the number of rows in the parity block interleaver, $N_{tail}$ is the number of tail bits per code block, $N_{ARQ\_proc}$ is the number of ARQ processes currently defined in the user equipment, and given that the size of the systematic block interleaver is substantially fixed.

17. A turbo coder with block puncturing for incremental redundancy, comprising:

a channel coder operable to code an input data stream into systematic bits and parity bits;

a first interleaver coupled to the channel coder, the first interleaver operable to load the systematic bits and parity bits into respective systematic and parity block interleavers in a column-wise manner;

a redundancy version selector coupled to the first interleaver, the redundancy version selector operable to select a redundancy;

a bit priority mapper coupled to the redundancy version selector, the bit priority mapper operable to map bits from the block interleavers in a row-wise manner in accordance with the selected redundancy, wherein the redundancy comprises a redundancy version for the coded bits of the block interleavers wherein the redundancy version sets one or more starting rows $\alpha_{i,j}$ for each redundancy version j, where $i \in \{S,P\}$ and $\alpha_{i,j} \in \{1, \ldots, N_{i,max\_row}\}$ and reads the coded bits from the selected starting rows in a pre-defined order and ratio, wherein if the end of the $N_{i,max\_row}{}^{th}$ interleaver is reached, reading shall continue from the first row of an interleaver which includes one of the systematic and parity block interleavers.

18. A turbo coder with block puncturing for incremental redundancy, comprising:

a channel coder operable to code an input data stream into systematic bits and parity bits;

a first interleaver coupled to the channel coder, the first interleaver operable to load the systematic bits and parity bits into respective systematic and parity block interleavers in a column-wise manner;

a redundancy version selector coupled to the first interleaver, the redundancy version selector operable to select a redundancy;

a bit priority mapper coupled to the redundancy version selector, the bit priority mapper operable to map bits from the block interleavers in a row-wise manner in accordance with the selected redundancy, wherein the redundancy comprises a redundancy version for the coded bits of the systematic and parity interleavers selected from one of the group of:

set the starting rows as the respective top rows of both the systematic and parity interleavers, wherein the coded bits of the systematic interleaver are read from its respective starting row to completion before the remaining coded bits are read from the parity interleaver starting at its respective starting row;

set the starting row as $N_{p,max\_row}/4$ of the parity interleaver, wherein the coded bits are read from the parity interleaver starting at its starting row;

set the starting row as $N_{p,max\_row}/2$ for the parity interleaver, wherein the coded bits are read from the parity interleaver starting at its starting row;

set the starting row as $3 \times N_{p,max\_row}/4$ for the parity interleaver, wherein the coded bits are read from the parity interleaver starting at its starting row;

set the starting rows as the top row of the parity interleaver and $N_{s,max\_row}/2$ for the systematic interleaver, wherein the coded bits are read equally from the systematic and parity interleaver starting at its their respective starting rows;

set the starting rows as $N_{p,max\_row}/4$ for the parity interleaver and $3 \times N_{S,max\_row}/4$ for the systematic interleaver, wherein the coded bits are read equally from the systematic and parity interleaver starting at their respective starting rows;

set the starting rows as the top row of the systematic interleaver and $N_{p,max\_row}/2$ for the parity interleaver, wherein the coded bits are read equally from the systematic and parity interleaver starting at their respective starting rows; and set the starting rows as $3 \times N_{p,max\_row}/4$ for the parity interleaver and $N_{S,max\_row}/4$ for the systematic interleaver, wherein the coded bits are read equally from the systematic and parity interleaver starting at their respective starting rows.

* * * * *